US011784541B2

(12) United States Patent
Chen et al.

(10) Patent No.: US 11,784,541 B2
(45) Date of Patent: Oct. 10, 2023

(54) GROUNDING STRUCTURE FOR MOTOR STATOR

(71) Applicant: Yen Sun Technology Corp., Kaohsiung (TW)

(72) Inventors: Graham Chen, Kaohsiung (TW); Chih-Tsung Hsu, Kaohsiung (TW); Hsin-Hsien Wu, Kaohsiung (TW); Chin-Hui Pan, Kaohsiung (TW); Yu-Chuan Huang, Kaohsiung (TW)

(73) Assignee: YEN SUN TECHNOLOGY CORP., Kaohsiung (TW)

( * ) Notice: Subject to any disclaimer, the term of this patent is extended or adjusted under 35 U.S.C. 154(b) by 0 days.

(21) Appl. No.: 17/711,806

(22) Filed: Apr. 1, 2022

(65) Prior Publication Data

US 2023/0133593 A1   May 4, 2023

(30) Foreign Application Priority Data

Oct. 29, 2021   (TW) .................................. 110140348

(51) Int. Cl.
  *H02K 11/40*  (2016.01)
  *H02K 1/04*   (2006.01)
  *H02K 1/18*   (2006.01)

(52) U.S. Cl.
  CPC .............. *H02K 11/40* (2016.01); *H02K 1/04* (2013.01); *H02K 1/18* (2013.01); *H02K 2211/03* (2013.01)

(58) Field of Classification Search
  CPC . H02K 11/40; H02K 1/04; H02K 1/18; H02K 2211/03
  USPC .............................................. 310/68 R, 215
  See application file for complete search history.

(56) References Cited

FOREIGN PATENT DOCUMENTS

CN   201830040 U  *  5/2011
TW   201612424 A  *  4/2016

* cited by examiner

*Primary Examiner* — Jose A Gonzalez Quinones
(74) *Attorney, Agent, or Firm* — Muncy, Geissler, Olds & Lowe, P.C.

(57) ABSTRACT

A grounding structure for a motor stator includes a silicon steel sheet unit, and upper and lower insulating frames clamping the silicon steel sheet unit therebetween. The grounding structure further includes a conductive member and a circuit board. The conductive member is clamped between the silicon steel sheet unit and the lower insulating frame, and protruding from a lower end of the lower insulating frame. The circuit board is disposed at a lower side of the lower insulating frame, and includes a negative contact that is connected to a lower edge of the conductive member.

4 Claims, 4 Drawing Sheets

GROUNDING STRUCTURE FOR MOTOR STATOR

CROSS-REFERENCE TO RELATED APPLICATION

This application claims priority of Taiwanese Patent Application No. 110140348, filed on Oct. 29, 2021.

FIELD

The disclosure relates to a grounding structure, particularly to a grounding structure for a motor stator that does not compromise the structure of a silicon steel sheet unit of the motor stator.

BACKGROUND

Designing electronic products that are Electromagnetic Compatibility (EMC) compliant is an important objective pursued by manufacturers of electronic products. EMC is defined as operating without creating electromagnetic interference to other equipment while preserving the original performance even though electromagnetic interference from other equipment is present. The electronic product must reduce electromagnetic interference (EMI) and not have excessive electromagnetic susceptibility (EMS) when encountering electromagnetic interference in order to achieve electromagnetic compatibility. Conventional electric motors are prone to causing electromagnetic interference to nearby equipment or are sensitive to electromagnetic interference from other equipment, due to the influence of their electromagnetic field, current, and voltage. Such electromagnetic interference may adversely affect performance or even cause operational failure in the conventional motors or the nearby equipment. In order to solve the problems as mentioned, anti-interference electronic components or conductive materials are conventionally inserted in the motor's circuit board to eliminate electromagnetic interference or improve electromagnetic tolerance. However, these electronic components or conductive materials only have a limited effect on improving EMC, while conversely, they may have an unfavorable influence on the characteristics of the motor.

As shown in FIG. 1, Taiwanese Utility Model Patent No. M598562 discloses an anti-interference structure for a motor stator, which includes two insulating frames 11 spaced apart from each other along an axis of the anti-interference structure, a silicon steel sheet unit 13 positioned between the two insulating frames 11 and having a slit 131 extending in an axial direction, a connector member 14 extending in the axial direction and embedded in the slit 131, and a circuit board 12 disposed at an outer side of and connected to one of the insulating frames 11. The connector member 14 protrudes out of the one of the insulating frames 11, and is connected to a ground contact of the circuit board 12 to achieve grounding, so that electromagnetic interference during motor operation can be avoided and electromagnetic compatibility can be enhanced.

However, the anti-interference structure of the motor stator requires a slit 131 to be formed in the silicon steel sheet unit 13, which will damage the structure of the silicon steel sheet unit 13. In addition, the binding between the connector member 14 and the silicon steel sheet unit 13 may not be strong enough due to the manufacturing tolerances of the slit 13. So there is still room for improvement.

SUMMARY

Therefore, the object of the disclosure is to provide a grounding structure for a motor stator without detracting from the structural integrity of the silicon steel sheet unit thereof.

According to the disclosure, a grounding structure for a motor stator includes a silicon steel sheet unit, an upper insulating frame, and a lower insulating frame. The upper insulating frame is disposed at an upper side of the silicon steel sheet unit along an axis. The lower insulating frame is disposed at a lower side of the silicon steel sheet unit along the axis, and cooperates with the upper insulating frame to clamp the silicon steel sheet unit therebetween.

The grounding structure further includes a conductive member and a circuit board. The conductive member is clamped between the silicon steel sheet unit and the lower insulating frame, and protrudes from a lower end of the lower insulating frame. The circuit board is disposed at a lower side of the lower insulating frame, and includes a negative contact that is connected to a lower edge of the conductive member.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
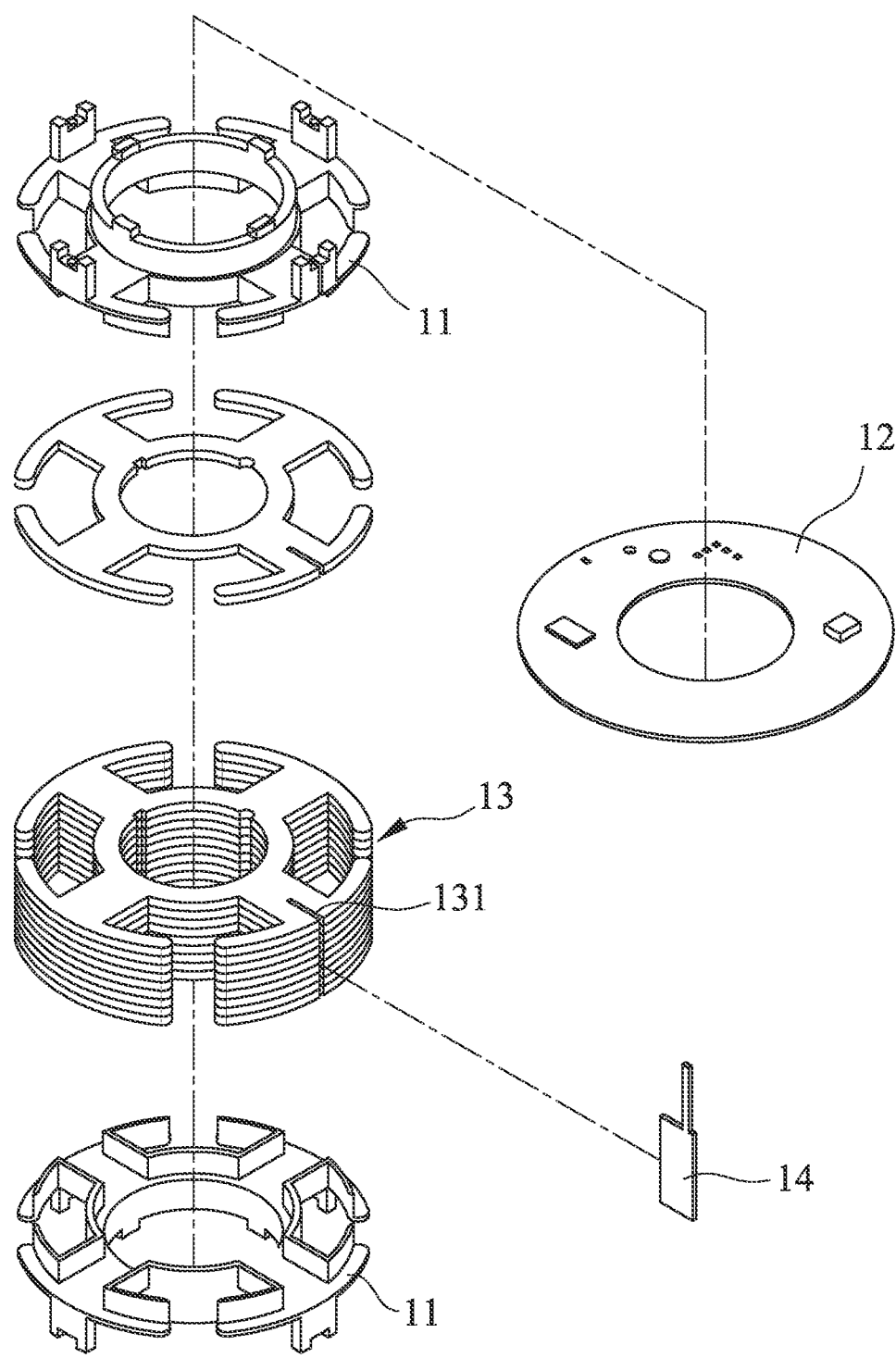
FIG. 1 is an exploded perspective view of the conventional anti-interference structure for a motor stator, which is disclosed in Taiwanese Utility Model Patent No. M598562.
Figure 2:
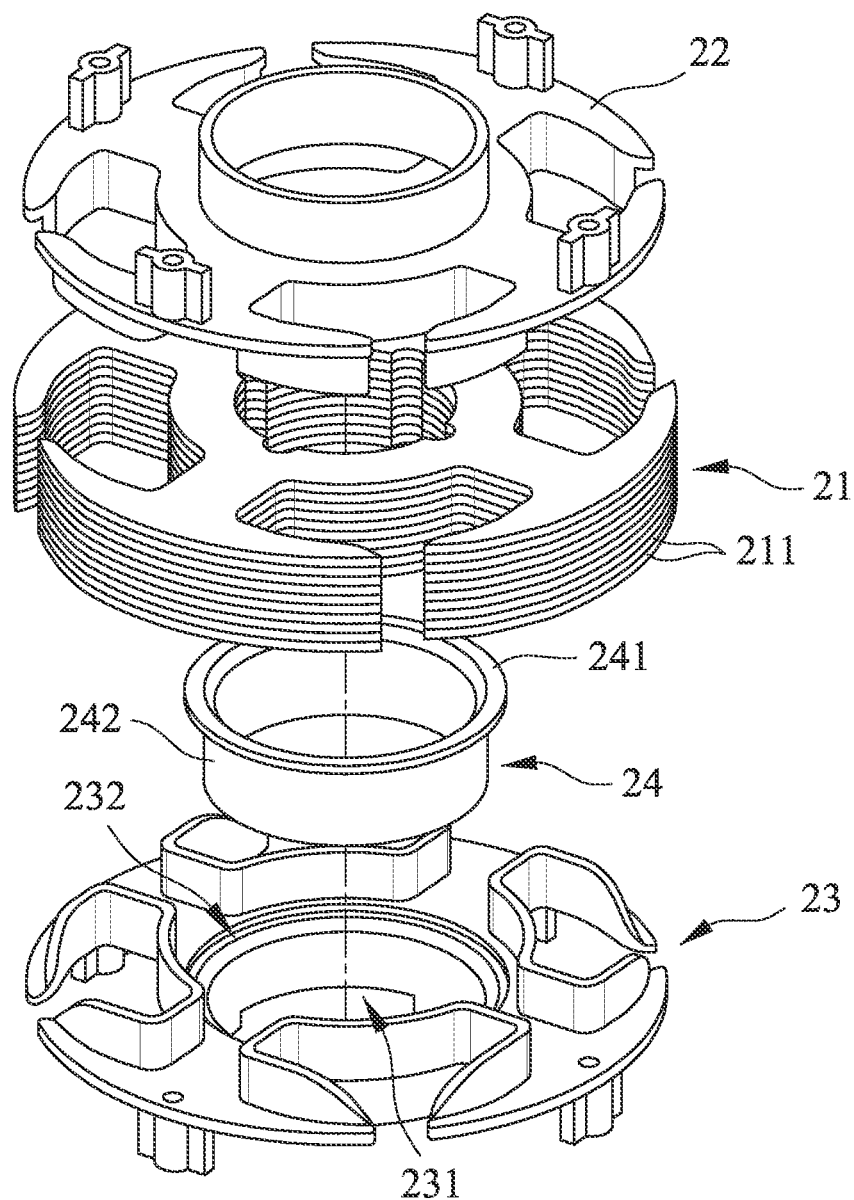
FIG. 2 is a fragmentary exploded perspective view of an embodiment of the grounding structure for a motor stator according to the disclosure with a circuit board and coils thereof being omitted.
Figure 3:
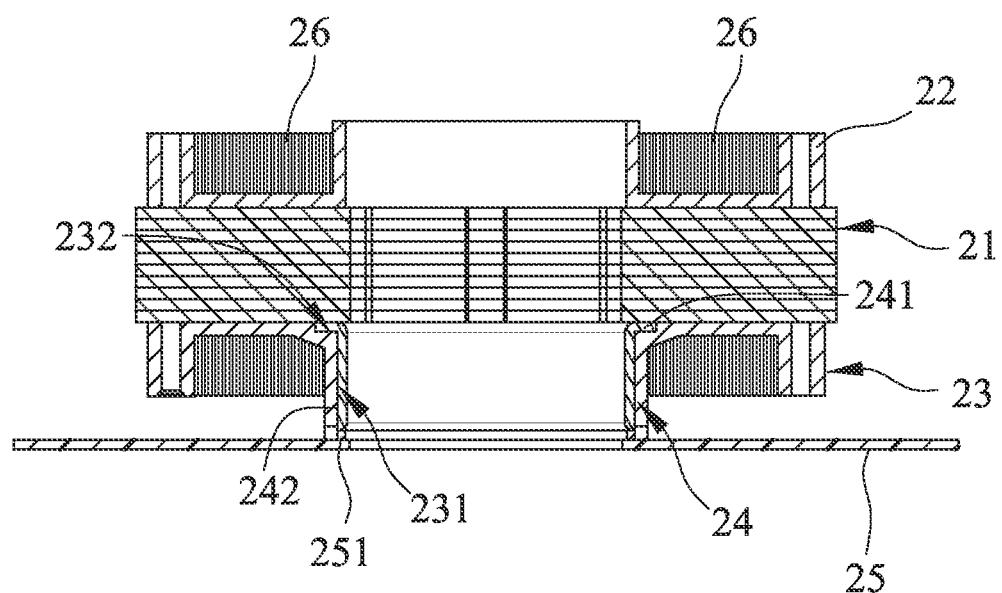
FIG. 3 is a vertical cross-sectional view illustrating the embodiment.

As shown in FIGS. 2 and 3, the embodiment of the grounding structure for a motor stator according to the disclosure includes a silicon steel sheet unit 21, an upper insulating frame 22 disposed at an upper side of the silicon steel sheet unit 21 along an axis, a lower insulating frame 23 disposed at a lower side of the silicon steel sheet unit 21 along the axis and cooperating with the upper insulating frame 22 to clamp the silicon steel sheet unit 21 therebetween, a conductive member 24 confined between the silicon steel sheet unit 21 and the lower insulating frame 23, a circuit board 25 disposed on a lower side of the lower insulating frame 23 and connected to the conductive member 24, and a plurality of coils 26 wound on the upper insulating frame 22 and the lower insulating frame 23. The silicon steel sheet unit 21 may be composed of a plurality of silicon steel sheets 211 stacked along the axis, but should not be limited to the above. It should be particularly noted that the upper and lower sides mentioned in this embodiment are relative to each other in the direction of the axis. This is only to facilitate the description of the relationship between the elements of this embodiment and should not limit the disposition direction of the present embodiment in actual use.

Figure 4:
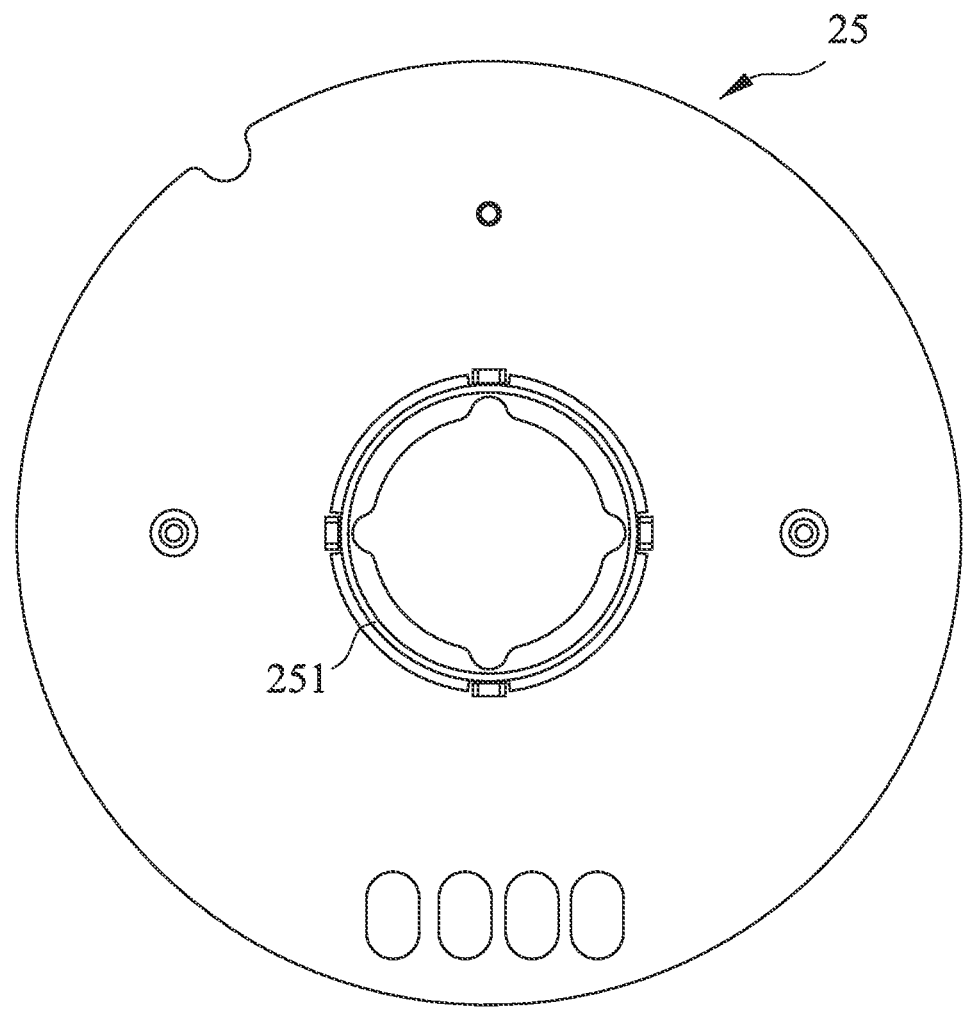
FIG. 4 is a top view of the circuit board of the embodiment.

Referring to FIGS. 2, 3, and 4, the lower insulating frame 23 surrounds to define an axial hole 231 that extends along the axis through upper and lower ends thereof, and a positioning groove 232 that extends transversely and outwardly from the axial hole 231 and that is adjacent to the silicon steel sheet unit 21. The conductive member 24 includes a rim portion 241 confined in the positioning groove 232, and a tubular portion 242 extending downwardly from an inner end of the rim portion 241 along the axis, passing through the axial hole 231, and protruding from the lower end of the lower insulating frame 23. In this embodiment, the conductive member 24 is made of copper, but it may also be made of other materials that have a grounding effect. The rim portion 241 is clamped between the silicon steel sheet unit 21 and the lower insulating frame 23. The circuit board 25 includes a negative contact 251 connected to a lower edge of the tubular portion 242 of the conductive member 24. In this embodiment, the negative contact 251 is substantially ring-shaped, as shown in FIG. 4. The top surface of the rim portion 241 and the lower edge of the tubular portion 242 are connected respectively to the silicon steel sheet unit 21 and the negative contact 251 to achieve a grounding effect to eliminate electromagnetic interference and increase electromagnetic tolerance. The coils 26 secure the upper insulating frame 22 and the lower insulating frame 23 to the silicon steel sheet unit 21, such that the conductive member 24 is tightly clamped between the silicon steel sheet unit 21 and the lower insulating frame 23. In other words, the coils 26 can ensure that the conductive member 24 is fixed between the silicon steel sheet unit 21 and the lower insulating frame 23. This arrangement prevents the problem of poor contact after installation of the connector member 14.

In summary, the disclosure achieves a secure installation of the conductive member 24 by positioning it between the silicon steel sheet unit 21 and the lower insulating frame 23, without cutting grooves on the silicon steel sheet unit 21 to avoid damaging the structural strength of the silicon steel sheet unit 21.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A grounding structure for a motor stator, comprising:
   a silicon steel sheet unit;
   an upper insulating frame disposed at an upper side of said silicon steel sheet unit along an axis;
   a lower insulating frame disposed at a lower side of said silicon steel sheet unit along the axis, and cooperating with said upper insulating frame to clamp said silicon steel sheet unit therebetween;
   a conductive member clamped between said silicon steel sheet unit and said lower insulating frame, and protruding from a lower end of said lower insulating frame; and
   a circuit board disposed at a lower side of said lower insulating frame, and including a negative contact that is connected to a lower edge of said conductive member,
   wherein said lower insulating frame defines
   an axial hole extending through upper and lower ends thereof along the axis, and
   a positioning groove extending transversely and outwardly from said axial hole and adjacent to said silicon steel sheet unit;
   wherein a portion of said conductive member is confined in said positioning groove; and
   wherein another portion of said conductive member passes through said axial hole and protrudes from said lower end of said lower insulating frame.

2. The grounding structure as claimed in claim 1, wherein said conductive member includes:
   a circular rim portion clamped between said silicon steel sheet unit and said lower insulating frame; and
   a tubular portion extending downwardly from an inner end of said circular rim portion along the axis, protruding from said lower end of said lower insulating frame, and connected to said circuit board.

3. The grounding structure as claimed in claim 2, wherein:
   said circular rim portion of said conductive member is confined in said positioning groove; and
   said tubular portion of said conductive member passes through said axial hole and protrudes from said lower end of said lower insulating frame.

4. The grounding structure as claimed in claim 1, wherein:
   said grounding structure further comprises a plurality of coils wound on said upper insulating frame and said lower insulating frame and securing said upper insulating frame and said lower insulating frame to said silicon steel sheet unit; and
   said conductive member is tightly clamped between said silicon steel sheet unit and said lower insulating frame.

* * * * *